United States Patent [19]
Kuechler

[11] Patent Number: 4,899,724
[45] Date of Patent: Feb. 13, 1990

[54] GAS HEATED BROILER

[76] Inventor: Irvin R. Kuechler, 172 E. 27th St., San Bernardino, Calif. 92404

[21] Appl. No.: 193,253

[22] Filed: May 11, 1988

[51] Int. Cl.$^4$ ............................................. F24C 3/00
[52] U.S. Cl. .............................. 126/41 R; 126/39 BA; 99/329 R
[58] Field of Search ................ 126/41 R, 41 A, 41 B, 126/41 C, 41 D, 41 E, 374, 390, 391, 392, 39 BA, 39 D; 99/295, 333, 329 X

[56] References Cited

U.S. PATENT DOCUMENTS

| 2,304,140 | 12/1942 | Bergholm . | |
|---|---|---|---|
| 2,610,678 | 9/1952 | Eskin et al. . | |
| 3,322,060 | 5/1967 | Gilbert | 126/41 R |
| 3,524,403 | 8/1970 | Treloar . | |
| 3,692,351 | 9/1972 | Christopher et al. | 126/41 R |
| 4,502,461 | 3/1985 | Keating | 126/374 |
| 4,503,502 | 3/1985 | Chapin . | |

FOREIGN PATENT DOCUMENTS 108337 6/1983 Japan .

*Primary Examiner*—Larry Jones
*Attorney, Agent, or Firm*—John Crowe

[57] ABSTRACT

A broiler having a cabinet and the usual grill for holding chicken or the like being broiled, several spaced-apart gas burners positioned below the grill in the cabinet and a section of angle iron, serving as a radiant, mounted over each of the burners. A heat sensor is positioned just under the grill and connected with a thermostat which has an attached regulator knob calibrated to permit different temperature settings for the cooking zone at the grill. The burners are fed fuel through a gas manifold provided with an aspirator to adjust the fuel-air mixture for optimal combustibility of the fuel. Each of the burners is provided with a pilot orifice element, which, in turn, is connected with a common aspirator to insure an optimal mix or fuel and air for pilot light purposes. When the broiler is in operation, the regulator knob is adjustable to a predetermined setting for a desired temperature level at the grill. The burners heat the radiants which then give off radiant heat to cook the chicken or other meat placed on the grill for that purpose. Since the radiants are spaced apart, most of the drippings from the cooking meat fall between them, rather than on their surfaces to burn and create smoke, bounce onto neighboring burners to plug their openings, etc.

15 Claims, 4 Drawing Sheets

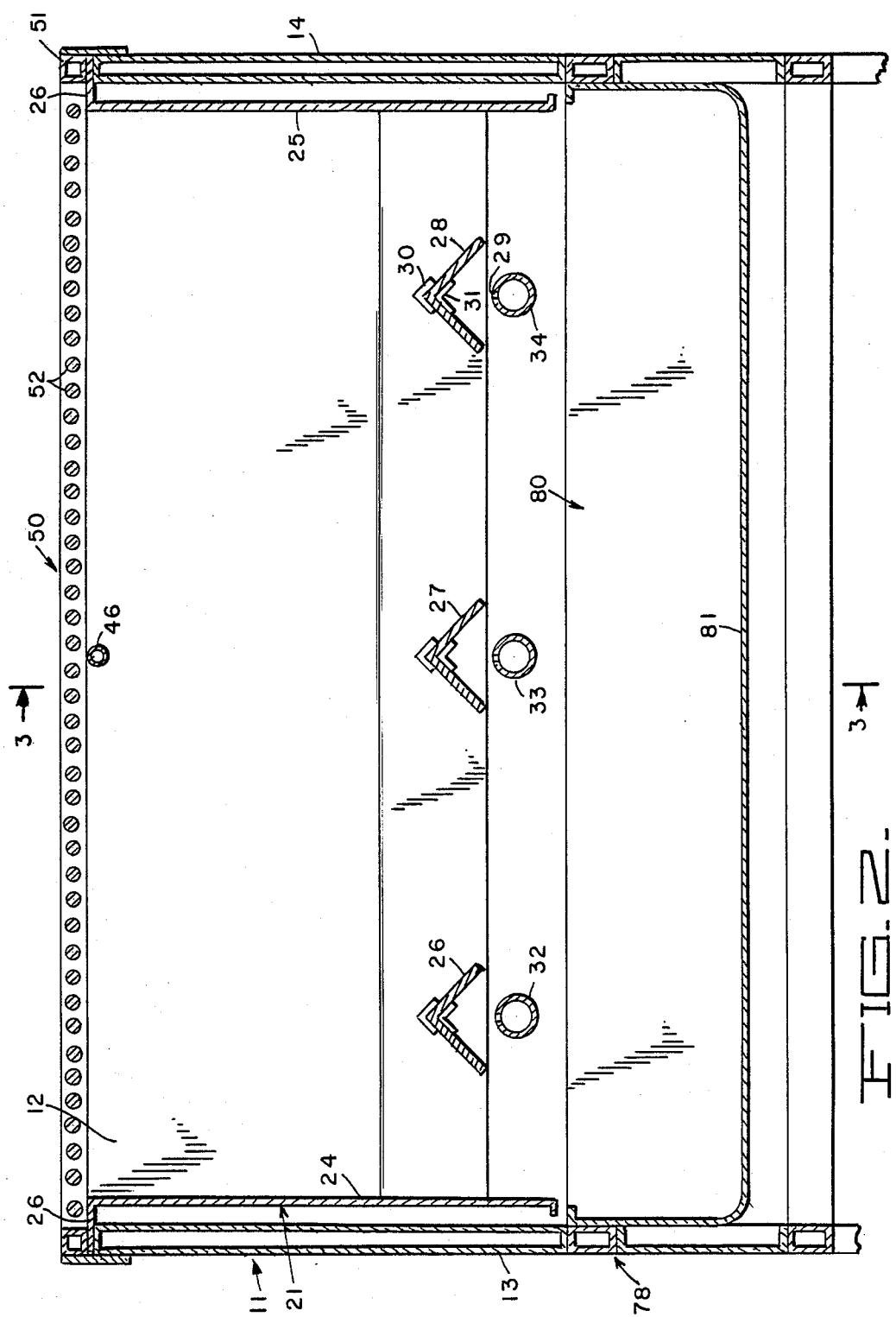

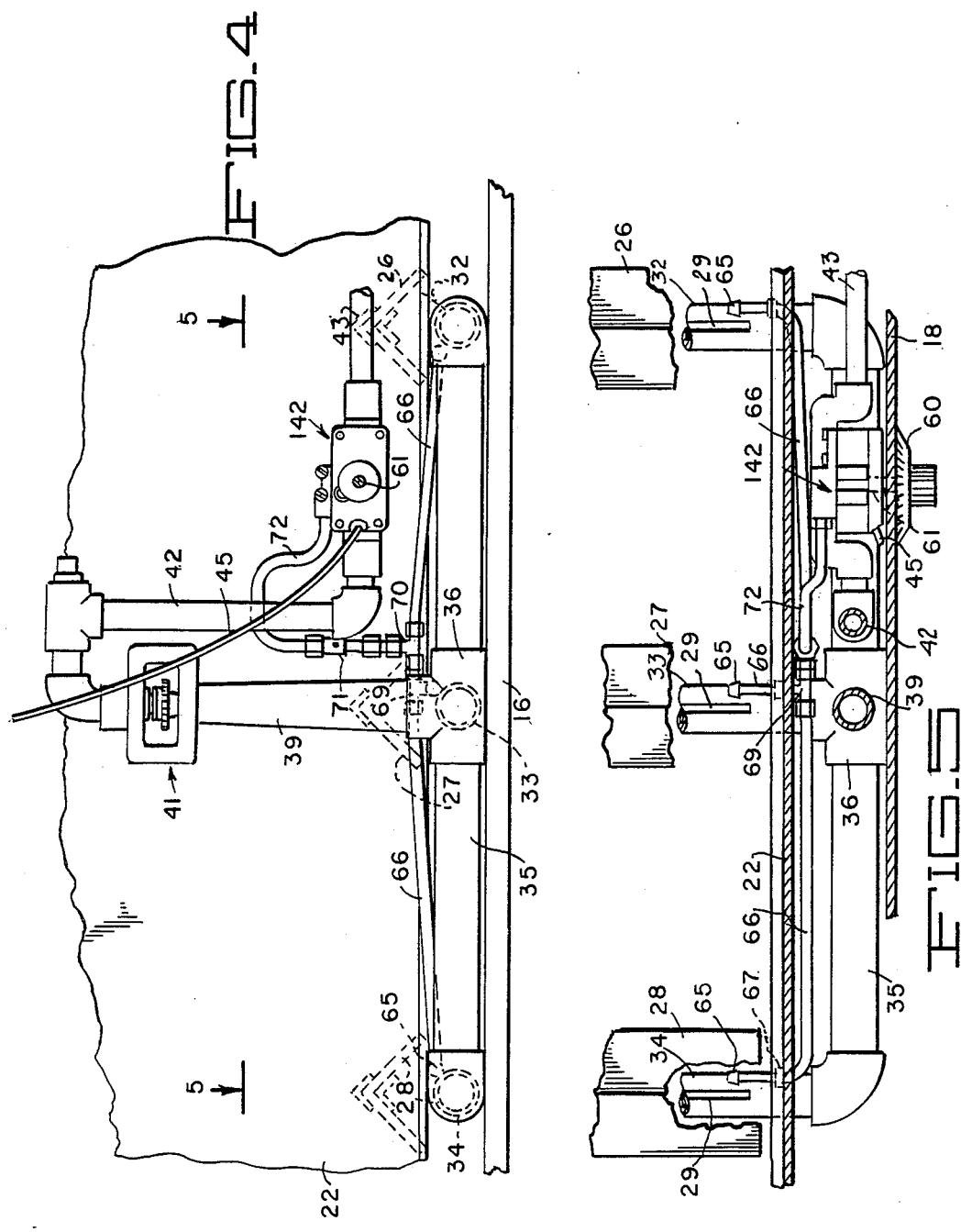

GAS HEATED BROILER

BACKGROUND OF THE INVENTION

1. Field of the Invention

This invention relates generally to food processing means and more particularly to broilers for cooking chicken and other meat products.

2. Description of the Prior Art

Broilers used in fast food and similar food preparing establishments for broiling large numbers of chickens and similar meat products have generally comprised a plurality of heating units, typically gas burners under angled covers, located below a grill on which a number of the chickens are placed. The heating units are individually controlled by an attendant in an attempt to provide an optimum amount of heat which is varied during the broiler process according to his or her judgement in order to cook the chickens within a desired time period.

Preferably, chickens and certain other meat products should be cooked substantilly uniformly throughout. If excessive heat is applied, the exteriors are cooked a desired amount before the interiors are properly cooked, and if continued heat is applied to adequately cook the interiors, the exteriors are overcooked, resulting in a food item that tends to be dry and tasteless. Also, an excessive amount of juices and fat driven from the chickens by the excessive heat drops onto the heating units to vaporize and burn, causing a large amount of greasy smoke to be generated. The burning fat, moreover, results in unhealthful carbon deposits on the cooking chicken or the like.

If an insufficient amount of heat is applied, the chickens are not properly cooked within a prescribed time period and might even cause salmonella poisoning if eaten.

Accordingly, with these prior art broilers a relatively high degree of skill and constant monitoring of the cooking process is required on the part of an attendant.

Furthermore, the heating units of conventional prior art broilers have always been located closely adjacent each other. Therefore, grease droplets falling from the grill area onto the angled covers of the heating units have tended to splash or be deflected onto adjacent burners, causing clogging of the burner jets. This has generally required nightly cleaning of the burners, a difficult and time consuming necessity.

SUMMARY OF THE INVENTION

A principal object of the present invention is to provide means for automatically controlling the amount of heat produced by a broiler and thereby enable an unskilled attendant to easily monitor its performance in use.

Another object is to reduce the amount of smoke and flare-ups due to the burning of grease and juices driven from chickens or the like during a broiling operation.

Another object is to reduce the amount of wasted heat and therefore the cost of broiling chickens and other meat products during a broiling operation.

A further object is to reduce the possibility of fire caused by the igniting of grease during the broiling of chickens or the like.

Other objects, advantages and features of the invention will become apparent to those skilled in the art in the light of subsequent disclosures herein.

According to the invention, a broiling apparatus is provided including a cabinet open at its top and bottom with a grill mounted thereon for supporting a plurality of chickens or the like to be broiled. Radiant heat emitting elements (radiants) are supported in the cabinet below the grill and burners are located directly below the elements to heat them to an elevated temperature whereat they emit radiant heat which serves to cook the chickens on the grill. The burners are automatically controlled by a thermostatic device having a temperature sensing element located to sense the temperature in the region adjacent the chickens. An adjustable regulating device is provided to regulate the thermostatic device to maintain the cooking temperature at the grill, due largely to radiant heat emitted by the radiants, at a desired level. As a result, unskilled attendants can easily control the broiling process by merely following thermostat setting and time instructions to insure that the chickens are properly and consistently cooked to a desired degree.

Due to the automatic control of the heating units, a minimum number of such units are required and these may be spaced widely apart, allowing the major portion of the grease and juice drippings from the chickens to fall between the radiants into a suitable receptacle, thus reducing the ignition of the grease and generation of smoke which would otherwise result (from the grease falling on the radiants).

The use of substantially exclusive radiant heating results in substantially uniform cooking of the chickens throughout instead of the chickens being cooked from the outside in, as would occur if heat by convection or conduction were employed.

Also, due to the relatively wide spacing of the heating units, little or no grease will splash from any radiant to a neighboring gas burner, thereby obviating the necessity of frequent cleaning of the burners.

BRIEF DESCRIPTION OF THE DRAWINGS

The manner in which the above and other objects of the invention are accomplished will be readily understood from the following specification when read in conjunction with the accompanying drawings, wherein:

FIG. 2 is a sectional elevational view of the broiler, taken along line 2—2 of FIG. 1.

FIG. 4 is a sectional elevational view of gas plumbing for the broiler, taken along line 4—4 of FIG. 3.

FIG. 5 is a sectional plan view, partly fragmentary, taken along line 5—5 of FIG. 4.

DESCRIPTION OF THE PREFERRED EMBODIMENTS

Figure 3:
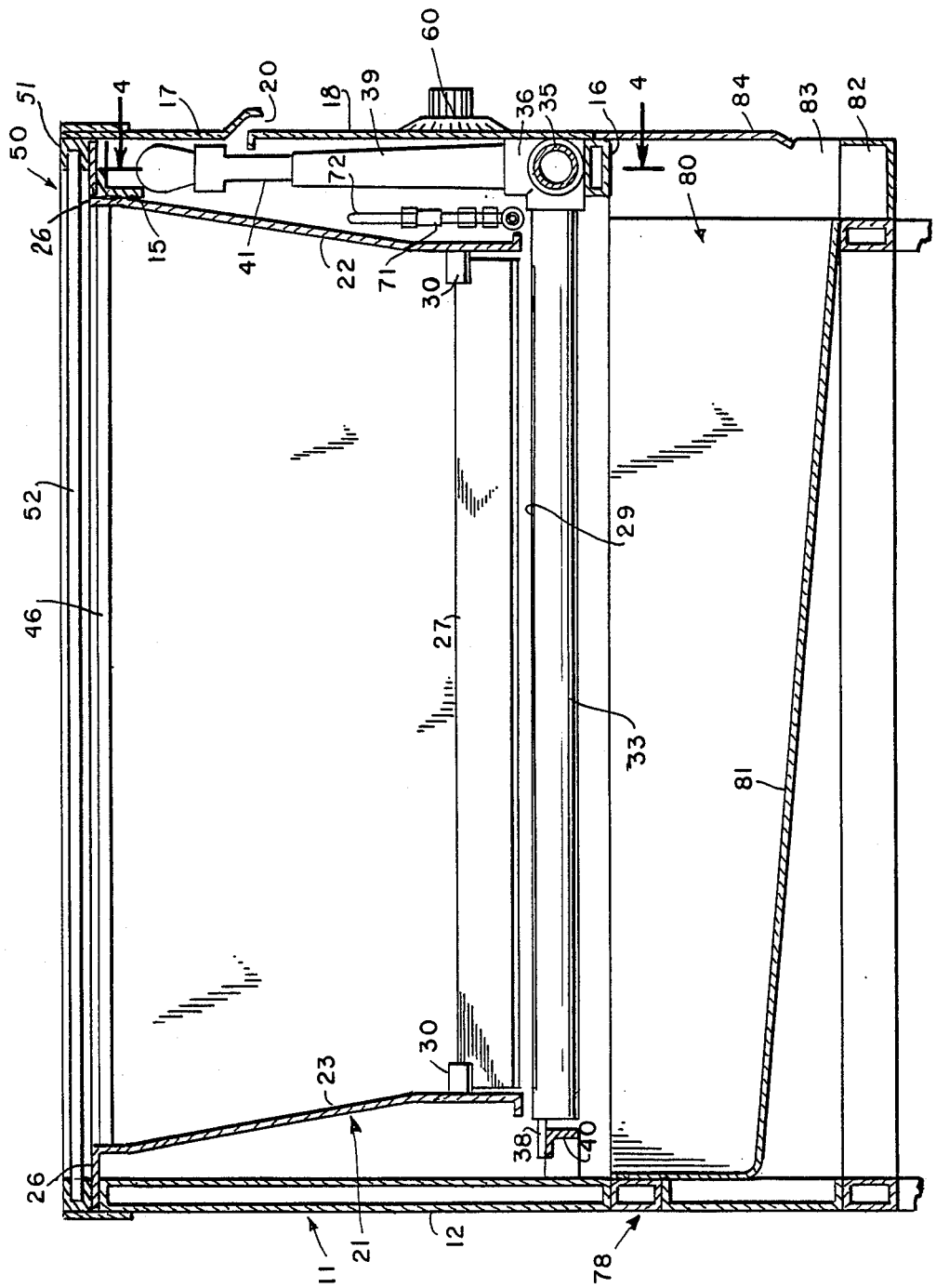
FIG. 3 is another sectional elevational view, taken along line 3—3 of FIG. 2.

Referring to the drawings, the illustrated broiler comprises a cabinet generally indicated at 11 which is open at the top and bottom. The cabinet comprises an outer casing, including a rear panel 12 (FIG. 3), side panels 13 and 14 (FIG. 2) and front cross bars 15 and 16

(FIG. 3) all suitably secured together as by welding. Front panels 17 and 18 are removably secured to the cross bars 15 and 16 to enclose the front of the cabinet. A horizontal slot 20 is formed between the panels 17 and 18 to permit a flow of air into the cabinet for a purpose to be described later.

The cabinet 11 further includes an inner shell generally indicated at 21 and comprising a front wall 22, rear wall 23, and two side walls 24 and 25, again suitably secured together as by welding. A horizontally extending lip 26 is formed at the upper ends of the walls 22-25 which rests on the upper edges of the various panels 12-14 and cross bar 15 to support the shell and enable expansion and contraction thereof, relative to the remainder of the cabinet, due to changes in temperature.

The walls of the shell 21 are spaced inwardly of the outer casing to reduce the transmission of heat outwardly through the cabinet. Also these walls extend substantially vertically to minimize accumulation of grease thereon.

A grill generally indicated at 50 is mounted on the lip 26 of the inner shell and comprises a rectangular frame 51 which carries a plurality of spaced rods 52 for supporting chickens or the like being broiled.

A series of three parallel radiant heat transmitting elements, or radiants, 26, 27 and 28, preferably formed of steel, are supported by the inner shell 21. These radiants are inverted sections of angle iron which are loosely nested at their ends between pairs of mating supports 30 and 31, respectively secured as by welding to walls 22 and 23 of the inner shell. This construction orients the radiants in proper position, yet permits longitudinal expansion and contraction thereof due to temperature changes.

Gas burner tubes 32, 33 and 34 are located directly below respective ones of the radiants 26-28 for the purpose of heating the radiants sufficiently to cause them to emit radiant heat. The tubes have narrow slots 29 extending lengthwise along their tops, which slots are filled with a suitable porous screen material (not shown) to form a row of burner jets along the length of each tube.

As shown in FIGS. 4 and 5, the burner tubes 32-34 are connected to a manifold conduit 35 which is suitably attached to the cross bar 16 and includes a central T-fitting 36 connected to the central burner tube 33. The opposite end of each of the burner tubes is closed and has a tab 38 extending therefrom which rests on an angled piece 40 suitably supported by the panel 12, thus permitting longitudinal expansion and contraction of the tubes due to temperature changes.

Figure 8:
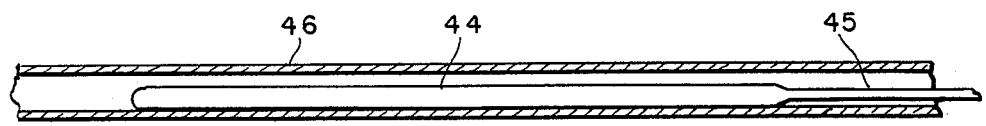
FIG. 8 is an enlarged sectional view, partly broken away, of a tube for supporting a thermostatic heat sensor bulb in the broiler.

The T-fitting 36 is also connected to the lower end of an aspirator tube 39 which extends upwardly therefrom to an aspirator 41. The latter is connected through piping 42 to a thermostat 142 which is of conventional construction. The thermostat chosen for the present disclosure is commercially available from the Robertshaw Controls Co. of Long Beach, Calif. as Model No. FDTH1. The thermostat is connected between the piping 42 and a supply line 43 for a combustible gas to control the flow of fuel therethrough and is itself controlled by a temperature sensor bulb 44 (FIG. 8) connected thereto by tubing 45. The sensor bulb 44 is located centrally within a metal tube 46 which extends across the cabinet and is attached at its ends to inner shell walls 22 and 23 directly below the grill 50. Thus, the bulb 44 is located substantially at the center of the grill. Accordingly, the thermostat controls the flow of gas from the supply line 43 to the burner tubes 32-34 under control of the sensor bulb 44 which senses the temperature in the region of chickens supported on the grill 50. The metal tube 46 absorbs radiant energy from the radiants 26-28 and thereby heats the sensor 44.

Figure 1:
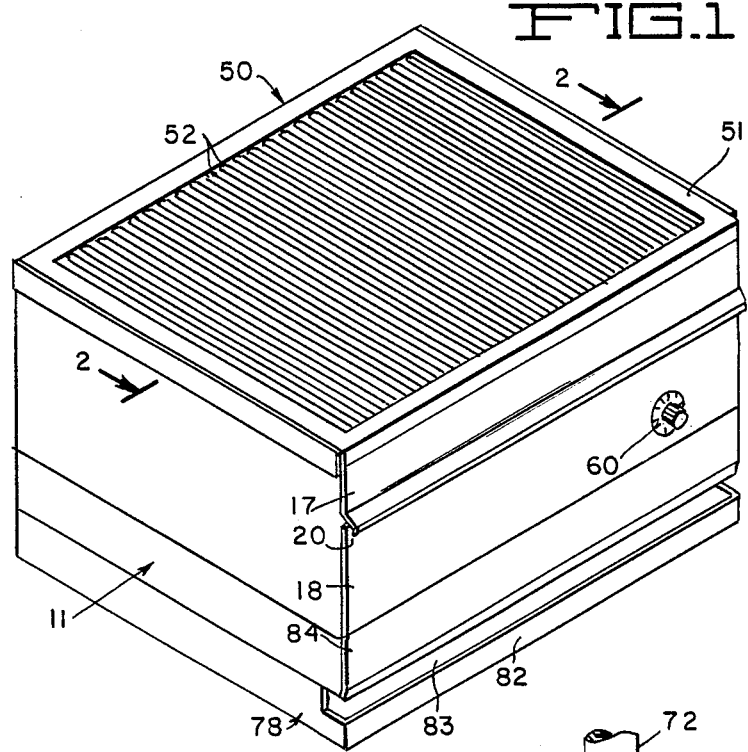
FIG. 1 is an isometric view of a broiler embodying a preferred form of the present invention.

The thermostat 142 further comprises an adjustable regulator knob 60 (FIGS. 1, 3 and 5) which is located in front of the panel 18 and is carried by a control shaft 61 protruding from the thermostat. The knob 60 is preferably calibrated to represent different temperatures so that adjustment thereof to a prescribed setting will cause the broiler to maintain a corresponding cooking temperature as will be described later.

Figure 6:
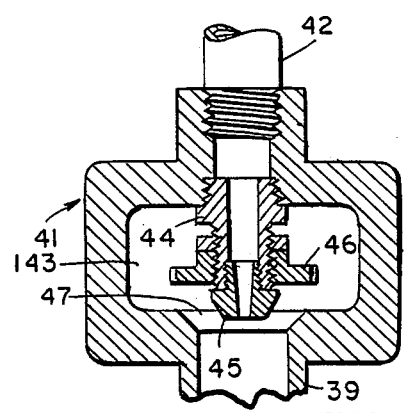
FIG. 6 is an enlarged sectional view of a main gas flow aspirator in the broiler.

As shown in FIG. 6, the aspirator 41 is open to the atmosphere at 143 to permit the passage of air into the aspirator tube 39. A tubular fitting 44 is threadedly secured in the aspirator to route to an orifice element 45 threadedly secured to its lower end. An air flow control member 46 is screw-threaded onto the fitting 44 and is adjustable therealong to regulate the size of the opening 47 through which air is ingested into the aspirator tube 39 and mixed with the jet of gas passing from the orifice element 45 to form a desired gas-air mixture.

It will be noted that the aspirator 41 is located between the panels 18 and 22 and thus any smoke resulting from juices and grease falling onto the heated radiants 26-28 will not be ingested by the aspirator to clog the burner tubes. Instead, fresh air is drawn into the aspirator from in front of the cabinet through the opening 20 between the front panels 17 and 18.

It should be noted that the provision of a single aspirator 41 in the manifold supply line for the burner tubes 32-34 insures a consistent gas-air mixture for all burner tubes and also reduces the complexity and cost of manufacture, as well as maintenance, of the broiler.

Figure 7:
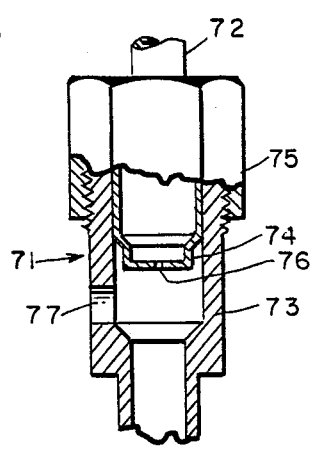
FIG. 7 is an enlarged sectional view of a pilot gas flow aspirator in the broiler.

Means are provided for igniting the burner tubes 32-34. For this purpose, pilot orifice elements 65 are mounted on the ends of tubes 66 secured by suitable clamps 67 to the sides of respective ones of the burner tubes adjacent the burner slots 29. The tubes 66 are connected together by T-fittings 69 and 70, the latter also being connected to an aspirator 71 (see also FIG. 7). The latter is connected by a tube 72 to a gas supply port in the thermostat 142. As FIG. 7 shows, the aspirator 71 comprises a fitting 73 in which an orifice member 74 is fitted and held in place by a nut 75 threaded onto the fitting 73 and serving to connect the fitting to the tube 72. A small orifice 76 is formed in the member 74 to direct a jet of gas downwardly through the fitting where it draws air through a hole 77 to form a suitable gas-air mixture. The pilot orifice elements 65 are positioned under radiants 26-28. The radiants thus shield them from grease drippings which would otherwise fall on them and plug up the pilot orifices therein. Also the radiants protect them from splattering from neighboring radiants.

The cabinet 11 is preferably mounted on a frame generally indicated at 78 having a grease receiving pan 80 mounted thereon to receive drippings from the chickens during the cooking process. The bottom 81 of the pan 80 slants toward the front of the cabinet 11 and empties into a grease receptacle 82.

A horizontal slot 83 is formed between the receptacle 82 and a panel 84 covering the front of the frame 78 to permit fresh air to enter the lower part of the cabinet 11 and aid in supporting combustion of the gas at the burner tubes 32-34.

As will be seen in FIG. 2, the radiant heater elements 26-28 are spaced from each other. In the illustrated embodiment of the broiler, the spacing between two adjacent elements is preferably at least twice the width of one such element when viewed in plan. Thus, during the broiling process, the major portion of the grease and juice drippings will fall directly into the pan 80 and only a small portion will strike the elements to produce a sufficient amount of smoke to impart a desired flavoring to the chickens being cooked. It should be noted that any increase in temperature at the grill as a result of burning grease on the radients will be sensed by the sensor 44 and compensated for by a reduction in gas flow brought about by thermostat 142. My thermostat system is thus capable of tailoring the gas flow to burners 32-34 to meet the temperature needs of the broiler regardless of the heat source by automatically cutting down on gas consumption by the broiler where less consumption is sufficient to maintain the desired temperature level at the broiler grill. This is, of course, an important cost saving advantage of my novel broiler.

It should be noted that more or fewer radiants and their associated burner tubes than illustrated herein can be incorporated in the broiler. Also, two or more groups of radiants and associated burner tubes may be incorporated within a single cabinet, each group being independent of the other(s) and having a separate regulating thermostat. Thus, one group can be utilized for partially broiling the chickens and another for finishing the broiling process and maintaining the chickens at a desired temperature until utilized.

From the foregoing, it will be seen that the broiler of the present invention enables an unskilled attendant to operate the same and to obtain consistent and improved cooking results by following simple instructions for setting the heat regulating knob 60 for prescribed periods of time.

In a sense, my broiler utilizes radiant heat for its cooking function somewhat similarly to the way the familiar briquette burning backyard barbecue does. But by virtue of my novel thermostatic control system, the proper temperature level at the grill is maintained through adjustment of the rate of gas fed to the burners rather than through raising and lowering of the grill as in the case of the backyard barbecue. Moreover, through the use of aspirators to control the gas-air mixture fed to the burners and other aspirators to control the mixture fed to the pilot lights of my broilers, highly efficient burning of the fuel takes place in the broilers. This, of course, means that the gas delivers more heat per unit volume than it would do without such careful control of the gas-air mixture, which obviously has an energy saving, cost reducing effect on the broiler operation. For all of these reasons, my novel broiler can deliver sufficient radiant heat from three spaced-apart radiants to cook as many chickens as a typical conventional broiler does with eight covered burners positioned so closely together that their covers catch and burn substantially all of the drippings from the chicken during the cooking process. And my three-radiant broiler does all of this without the necessity of having a cook or attendant present to continually adjust the eight valves to the eight burners in the conventional broiler. Such conventional broilers typically require a separate valve for each of their burners. By contrast, my novel three-radiant broiler has only one regulator knob to set for the desired temperature level at its grill area, which level, as previously indicated, is maintained regardless of the source of heat (which can come partly from the burning drippings, as well as from the radiants).

While a preferred embodiment of my novel broiler has been herein illustrated and described, it is to be understood that the invention is not limited to that particular embodiment, but is broad enough in concept to encompass all variant forms thereof encompassed by the language of the following claims. For example, while I have stressed the use of a fire source below the grill of my broiler in this application, this fire source could be either above or below the grill, or both above and below it, as desired. Such a broiler with radiants above and below the grill could, for example, be employed for the boiling of steaks without the necessity of turning the steaks during the cooking procedure. In another of its embodiments, the broiler could, for example, have two sets of two radiants in a single cabinet and two regulating thermostats, one for each of the two sets of radiants, therein.

I claim:

1. A broiler particularly suitable for the cooking of chicken and other meat products comprising:
    a grill for supporting said products;
    at least one radiant heat emitting element spaced away from one side of said grill;
    said element being effective upon being heated to emit radiant energy for the cooking of said products;
    a heating device for heating said element positioned near the side thereof remote from said grill;
    heat sensing means effective to sense the temperature of the region adjacent said grill;
    control means responsive to said heat sensing means for controlling the heat flow from said heating device; and
    support means for maintaining said grill, said radiant heat emitting element, said heating device, said heat sensing means and said control means in their proper relative positions for proper functioning of said broiler.

2. A broiler as defined in claim 1 including:
    manually adjustable regulating means for causing said control means to react to said sensing means to maintain the grill area at a desired temperature level.

3. A broiler as defined in claim 2 in which
    said radiant heat emitting element is supported below said grill.

4. A broiler as defined in claim 3 in which said heat sensing means is supported adjacent said grill.

5. A broiler as defined in claim 4 in which said at least one radiant heat emitting element comprises a plurality of said heat emitting elements and a like plurality of said heating devices, said heat emitting elements being of elongate configuration and supported in parallel spaced-apart relationship.

6. A broiler as defined in claim 5 in which said support means comprises a cabinet open at its top and bottom;
    said cabinet supports said grill in its open top;
    said cabinet supports said plurality of radiant heat emitting elements near its open bottom; and
    said cabinet supports said heat sensing means adjacent said grill.

7. A broiler as defined in claim 6 in which said heat sensing means includes a tubular member positioned to extend from the front to the rear of said cabinet; and a heat sensing device positioned within said tubular member intermediate its ends.

8. A broiler as defined in claim 7 in which each of said heating devices is a gas burner.

9. A broiler in accordance with claim 8 including a common gas conduit for supplying fuel to each of said gas burners below respective ones of said heat emitting elements; and an aspirator in said conduit for introducing outside air into the gas fed to said burners to provide a gas-air mixture of optimal combustion efficiency for producing purposes.

10. A broiler as defined in claim 9 including a shell adapted to fit within and be supported by said cabinet, said shell having walls spaced inwardly from the walls of said cabinet; and said broiler including means for supporting said aspirator between said shell and said cabinet.

11. A broiler as defined in claim 10 including a pilot orifice element for each of said burners and an air aspirator cooperating therewith for improved efficiency of fuel use, and means for supporting said pilot orifice element and air aspirator in proper positions for use.

12. A broiler as defined in claim 11 in which said manually adjustable regulating means for causing said control means to react to said sensing means comprises a regulator knob with setting calibrated to represent different temperatures whereby an attendant can easily follow a direction to set the knob at a prescribed setting for a prescribed period of time to maintain a predetermined temperature level corresponding to that setting at the grill without the necessity of any manual adjustment of the gas flow to said gas burners during that time period.

13. A broiler as defined in claim 12 in which said plurality of radiant heat emitting elements comprises three such elements.

14. A broiler as defined in claim 13 in which said radiant heat emitting elements are of substantially equal width and spaced from one another a distance equal to at least twice this width.

15. A broiler as defined in claim 14 in which said heat sensing means is supported centrally of said grill.

* * * * *